United States Patent
Garcia

(10) Patent No.: US 10,127,650 B2
(45) Date of Patent: Nov. 13, 2018

(54) METHOD FOR CONTROLLING THE SUSPENSION OF A VEHICLE BY PROCESSING IMAGES FROM AT LEAST ONE ON-BOARD CAMERA

(71) Applicants: CONTINENTAL AUTOMOTIVE FRANCE, Toulouse (FR); CONTINENTAL AUTOMOTIVE GMBH, Hannover (DE)

(72) Inventor: Lucien Garcia, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/500,317

(22) PCT Filed: Jul. 23, 2015

(86) PCT No.: PCT/EP2015/001514
§ 371 (c)(1),
(2) Date: Jan. 30, 2017

(87) PCT Pub. No.: WO2016/015846
PCT Pub. Date: Feb. 4, 2016

(65) Prior Publication Data
US 2017/0213336 A1    Jul. 27, 2017

(30) Foreign Application Priority Data
Jul. 31, 2014   (FR) ..................................... 14 57411

(51) Int. Cl.
*G06K 9/00*     (2006.01)
*G06T 7/00*     (2017.01)
(Continued)

(52) U.S. Cl.
CPC .......... *G06T 7/0004* (2013.01); *B60G 17/016* (2013.01); *B60G 17/019* (2013.01);
(Continued)

(58) Field of Classification Search
None
See application file for complete search history.

(56) References Cited

U.S. PATENT DOCUMENTS 7,512,520 B2   3/2009 Sack et al.
7,706,942 B2   4/2010 Miyajima
(Continued)

FOREIGN PATENT DOCUMENTS

CN   102848875   1/2013
CN   103057376   4/2013
(Continued)

OTHER PUBLICATIONS

International Search Report, dated Oct. 21, 2015, from corresponding PCT Application.
(Continued)

*Primary Examiner* — Vikkram Bali
(74) *Attorney, Agent, or Firm* — Young & Thompson

(57) ABSTRACT

The disclosed method checks the state of degradation of the suspension of a vehicle without having to carry out tests that immobilize the vehicle or to use non-objective expertise. The method processes data provided by at least one front camera in an on-board visual system. The checking method includes steps for periodically acquiring images provided by the camera or cameras, followed by storage of the positional data of the three-dimensional road in relation to a flat road and basic positional parameter data for the path of the vehicle. The error between the ideal values of the suspension parameters of a chosen suspension model and the values of these parameters corresponding to the stored path data from
(Continued)

the positional data is then minimized. By iteration, the accuracy ε of the error reaches a predetermined value sufficient to diagnose a state of the suspension.

20 Claims, 2 Drawing Sheets

(51) Int. Cl.
| | |
|---|---|
| G01M 17/04 | (2006.01) |
| B60G 17/018 | (2006.01) |
| B60G 17/0185 | (2006.01) |
| B60G 17/019 | (2006.01) |
| B60G 17/016 | (2006.01) |
| B60R 11/04 | (2006.01) |
| H04N 13/239 | (2018.01) |
| B60G 11/16 | (2006.01) |
| B60G 13/00 | (2006.01) |
| B60G 15/06 | (2006.01) |
| B60R 11/00 | (2006.01) |

(52) U.S. Cl.
CPC ..... *B60G 17/0182* (2013.01); *B60G 17/0185* (2013.01); *B60R 11/04* (2013.01); *G01M 17/04* (2013.01); *G06K 9/00201* (2013.01); *H04N 13/239* (2018.05); *B60G 11/16* (2013.01); *B60G 13/006* (2013.01); *B60G 15/063* (2013.01); *B60G 2202/12* (2013.01); *B60G 2202/24* (2013.01); *B60G 2202/312* (2013.01); *B60G 2202/322* (2013.01); *B60G 2400/824* (2013.01); *B60G 2401/14* (2013.01); *B60G 2401/142* (2013.01); *B60G 2500/30* (2013.01); *B60G 2600/08* (2013.01); *B60G 2600/084* (2013.01); *B60G 2800/70* (2013.01); *B60G 2800/802* (2013.01); *B60R 2011/0026* (2013.01); *B60R 2300/105* (2013.01); *B60R 2300/107* (2013.01); *B60R 2300/303* (2013.01); *G06T 2207/30164* (2013.01); *G06T 2207/30252* (2013.01)

(56) References Cited

U.S. PATENT DOCUMENTS

| | | | |
|---|---|---|---|
| 7,872,764 B2 | 1/2011 | Higgins-Luthman et al. | |
| 2007/0021886 A1 | 1/2007 | Miyajima | |
| 2009/0097038 A1 | 4/2009 | Higgins-Luthman et al. | |
| 2012/0078572 A1* | 3/2012 | Bando | G08G 1/0112 702/150 |
| 2013/0103259 A1 | 4/2013 | Eng et al. | |
| 2014/0247352 A1* | 9/2014 | Rathi | B60R 1/00 348/148 |
| 2015/0088378 A1* | 3/2015 | Sugai | B60G 17/018 701/37 |
| 2015/0203035 A1* | 7/2015 | Watanabe | B62D 15/0295 382/103 |
| 2015/0232368 A1* | 8/2015 | King | C03B 23/0302 65/291 |
| 2017/0137023 A1* | 5/2017 | Anderson | B60W 30/02 |

FOREIGN PATENT DOCUMENTS

| | | |
|---|---|---|
| EP | 1 612 067 A1 | 1/2006 |
| ES | 2 283 335 T3 | 11/2007 |
| JP | H5-262113 A | 10/1993 |
| JP | 2014-25773 | 2/2014 |
| WO | 2013-034561 | 3/2013 |

OTHER PUBLICATIONS

French Search Report, dated Mar. 6, 2015, from corresponding French Application.

* cited by examiner

METHOD FOR CONTROLLING THE SUSPENSION OF A VEHICLE BY PROCESSING IMAGES FROM AT LEAST ONE ON-BOARD CAMERA The present invention relates to a method for checking the state of degradation of a suspension system fitted to a motor vehicle by processing image data provided by at least one on-board camera carried by the vehicle, and in particular by two cameras in a stereoscopic system.

BACKGROUND OF THE INVENTION

Motor vehicle suspension performs two functions: helping to keep the vehicle safely on the road under all circumstances (braking, cornering, different road surfaces, etc.) and ensuring comfortable conditions for passengers in an insulated passenger compartment (noise, vibration, shocks, etc.).

These goals are generally at odds, and so require compromise solutions, in particular between the stiffness of the springs and the compression ratio of the shock absorbers generally making up the motor vehicle suspension members on each wheel.

In order to monitor the state of a suspension system, with a view to estimating the appropriate time to change same by identifying a critical degree of degradation due to ageing of the components or faults that worsen over time, the suspension may be tested manually during a road worthiness test, although such solutions are dependent on the degree of expertise of the operative, or a test bench may be used to provide objective results.

These benches test the effectiveness of the suspension by measuring adhesion values, in particular using the measurement method provided by the European Shock Absorber Manufacturers Association (EUSAMA).

However, the measurements provided by such test benches are not precise enough to determine the state of a suspension system in terms of full-scale behaviour in a real context.

SUMMARY OF THE INVENTION

The present invention is intended to check the state of degradation of the suspension of a vehicle safely and continuously without having to carry out tests that immobilize the vehicle or to use non-objective expertise. To do so, the invention proposes processing the data provided by at least one front camera in a visual system carried on board the vehicle.

Such cameras are generally designed for driver assistance units. These units are used to detect obstacles located in the visual field in front of these vehicles.

In particular, stereoscopic systems are able to precisely determine the distance between the vehicle and the obstacles located in front of the vehicle using two on-board cameras arranged close to one another to provide pairs of images to a digital processing unit. The distance between these obstacles and the vehicle is then detected by analyzing the disparity between the images formed. The driver can then advantageously be made aware of the obstacles recognized by means of a warning signal in the driver assistance system.

Such cameras may also have other functions, such as detecting the continuous line and providing a warning if the continuous line is crossed, automatically deactivating full-beam headlights when passing a vehicle in the opposite direction (at least partial deactivation by switching to dipped headlights or switching at least one headlight to standby), detecting pedestrians and triggering emergency brake if necessary, etc.

According to the invention, data related to the presence of irregularities on the road that are provided by processing images from the visual system, as well as data related to the position of the vehicle on said road, are used to check the state of the suspension of the vehicle in relation to a reference suspension.

More specifically, the present invention relates to a method for checking the state of degradation of a suspension system fitted to a motor vehicle comprising the following steps:

periodic acquisition of successive images of a forward field of vision provided by at least one camera in a visual system carried on board the vehicle and stored in the form of pixels, storage of positional data of a real three-dimensional road in relation to a reference road considered to be flat, using the pixels stored in the previous step, storage of the basic rotational and translational positional parameter data of a path of the vehicle using the positional data memorized in relation to the flat road, minimization of an error between the predetermined intrinsic suspension parameter values of a suspension model in an ideal state and the intrinsic suspension parameter values of said model corresponding to the basic positional parameter data of the path stored in the previous steps, iteration of the previous step until an accuracy $\varepsilon$ of said error reaches a predetermined value $\varepsilon_R$ to diagnose a state of the suspension as a function of the deviation determined during the previous step, and triggering of an alarm in the event of diagnosis of a pre-critical suspension state.

In a preferred embodiment, the on-board visual system is a stereoscopic system comprising two cameras providing pairs of images in order to construct three-dimensional data on the basis of the disparities, which are preferably digitally filtered, between each pair of images.

According to particularly advantageous embodiments:

the road considered to be flat is determined by averaging the standard deviations of the data on the real three-dimensional road with a predetermined number of pixels, the path of the vehicle is identified by successive values of specific parameters relating to the height of the three-dimensional road and of the vehicle, and to the roll rotation and/or pitch rolling of the vehicle, these specific positional parameter values being determined using the stored data for the real three-dimensional road and the basic positional parameters, the suspension model for each wheel of the vehicle is selected from a library including a model single-stage suspension system with equivalent springs or equivalent springs/shock absorbers arranged in parallel, and a two-stage suspension system with equivalent springs or equivalent springs/shock absorbers assembled in parallel for a suspension stage proper, and with equivalent springs or equivalent spring/shock absorbers arranged in parallel for a tire stage, the suspension parameters relate to the stiffness of the equivalent spring or springs and the compression ratio of the equivalent shock absorber or shock absorbers per wheel, the suspension is controlled by active, semi-active or passive control, the accuracy ε of the suspension parameter values enables the state of inflation of the tires to be determined, the accuracy ε of the suspension parameter values makes it possible to determine which of the suspension proper or the tire(s) is in a pre-critical state.

BRIEF DESCRIPTION OF THE DRAWINGS

Other data, characteristics and advantages of the present invention are set out in the detailed nonlimiting description below, provided with reference to the figures attached which show, respectively.

DETAILED DESCRIPTION OF THE PREFERRED EMBODIMENTS

Figure 1:
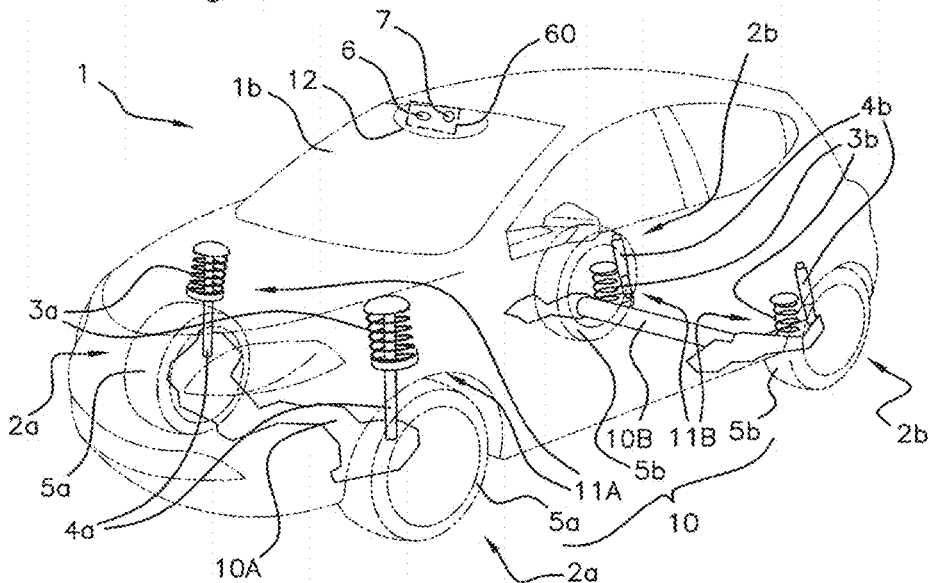
FIG. 1 is a transparent perspective view of a motor vehicle showing the suspension members arranged on each wheel of the vehicle.

FIG. 1 is a transparent perspective view of a vehicle 1 showing the suspension 10 of same. This suspension 10 comprises, respectively for the front and rear wheels 2a, 2b, helical springs 3a and 3b mounted coaxially with (on the front axle 10A in the example) or close to (on the rear axle 10B in the example) the front and rear shock absorbers 4a, 4b, these springs and shock absorbers forming the front and rear suspension members proper 11A, 11B, and the tires 5a and 5b mounted on the corresponding wheels 2a and 2b.

Such a suspension system 10 is active in the example shown, i.e. controlling this suspension enables the vehicle to be kept on a flat path if the suspension is a perfect reference suspension system, this path being held at a given height in relation to the ground while the vehicle is in movement.

Alternatively, suspension control is deemed to be semi-active when same does not oppose the vertical movement of the wheels, but compensates for this movement to prevent same from being amplified. If no suspension control is used, this control is deemed to be passive, in the absence of any control or standby state.

The vehicle 1 also includes cameras 6 and 7 in a stereoscopic system 60 that are assembled on an on-board supporting element 12 arranged on the upper edge of the windshield 1b of the vehicle 1.

Figure 2:
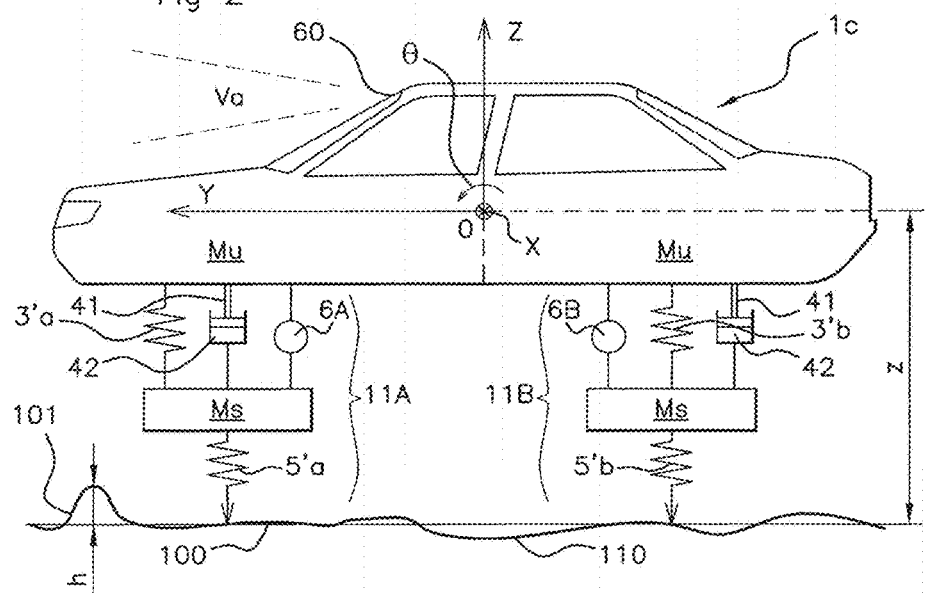
FIG. 2 is a side view of a vehicle schematically showing an example suspension model of the suspension members proper and of the tires of the vehicle.

In order to illustrate a suspension model 10, the side view of the vehicle body 1c in FIG. 2 shows, in model form, the front and rear suspension members proper 11A and 11B and the front and rear tires 5a, 5b in FIG. 1.

Each of the suspension members proper 11A or 11B comprises an equivalent spring 3'a or 3'b and a shock absorber that are assembled in parallel, each shock absorber being represented by a piston 41 combined with an oil cylinder 42. A suspension control actuator 6A and 6B is provided for each suspension member proper in order to adjust the suspension actively for each wheel 2a and 2b (FIG. 1).

Each suspension member proper 11A or 11B bears a sprung mass Ms estimated to be one quarter of the mass of the vehicle body 1c. Furthermore, each tire, represented here by a spring 5'a, 5'b, bears an unsprung mass Mu, estimated to be one quarter of the chassis. The stiffness of the springs and the compression ratio of the shock absorbers are set in advance to enable the actuators to distribute the masses optimally at all times when the vehicle is in movement.

Under these conditions, the pairs of images of the forward field of vision Va successively stored by the stereoscopic system 60 rigidly attached to the body 1c also save the behaviour of the vehicle that depends on the state of the suspension of same.

This behaviour is entirely determined using variations in the six basic positional parameters in an orthogonal reference system OXYZ, three rotations (pitch, roll and yaw, respectively about the axes OX, OY and OZ) and three translational movements (parallel to the axes OX, OY and OZ), as conventionally applied. In this case, the reference system OXYZ is oriented according to the reference road 100 considered to be flat, which is determined by averaging the standard deviations of the pixels of the road from the forward field of vision Va (i.e. of a real three-dimensional road 110) successively stored. Fewer than six basic parameters may be used in simplified embodiments.

Determining successive values of the six basic parameters saved by the stereoscopic system makes it possible to determine, using a suitable matrix transformation, the variations in the values of the specific positional parameters, defining the path of the vehicle 1 on the reference road 100 and characterizing the behaviour of the vehicle in relation to the state of the suspension of same.

In the example, these specific positional parameters relate to the variation in height "h" of the irregularities 101 in the real three-dimensional road 110 in relation to the reference road 100, as well as two other parameters related to the position of the vehicle in the reference system OXYZ, specifically the height "z" of same measured along the axis OZ and the pitch rotation of same "Θ" about the axis OX. Alternatively, roll rotation of the vehicle may be added, or pitch rotation may be replaced by roll rotation.

Figure 3:
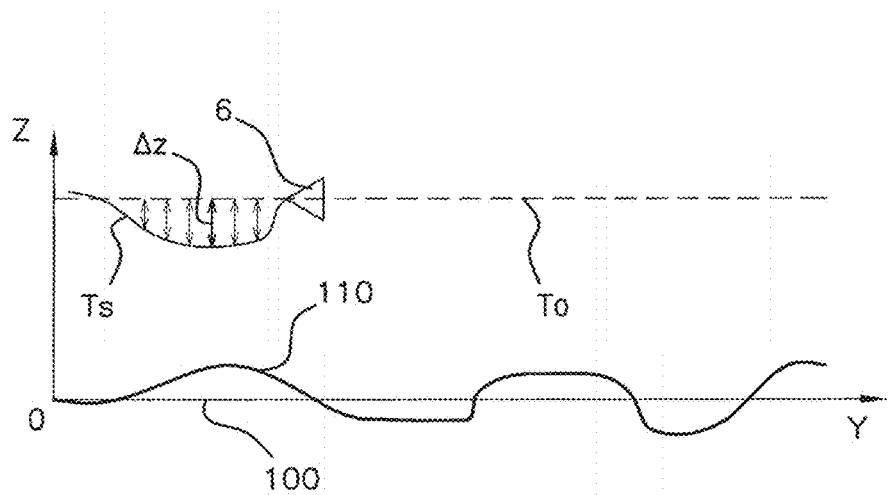
FIG. 3 is a side view of the profiles of the real path of a camera in the visual system carried on-board the vehicle, of the anticipated path of this camera estimated using the suspension model, and of the road on which the vehicle is running.

The side view in the plane ZOY in FIG. 3 shows the path Ts of a camera 6 in the stereoscopic system of the vehicle moving on a profile of a real three-dimensional road 110, in which OY matches the linear profile of the reference road 100 mentioned above. The path Ts is determined using the saved images in relation to the reference road 100 and matches the path of the vehicle body 1c stabilized by the active suspension controls 6A, 6B (FIG. 2).

FIG. 3 also shows the ideal path T0 of the camera 6 parallel to the reference road 100 when the suspension is considered to be ideal with the suspension model in question (see FIG. 2). This ideal path T0 is parallel to the linear profile of the reference road 100: the deviations Δz between the paths Ts and T0 therefore resulting from the variations in the specific positional parameters "z" and "Θ" of the vehicle due to worsening state of the suspension with reference to an ideal state in the suspension model used (see FIG. 2).

Figure 4:
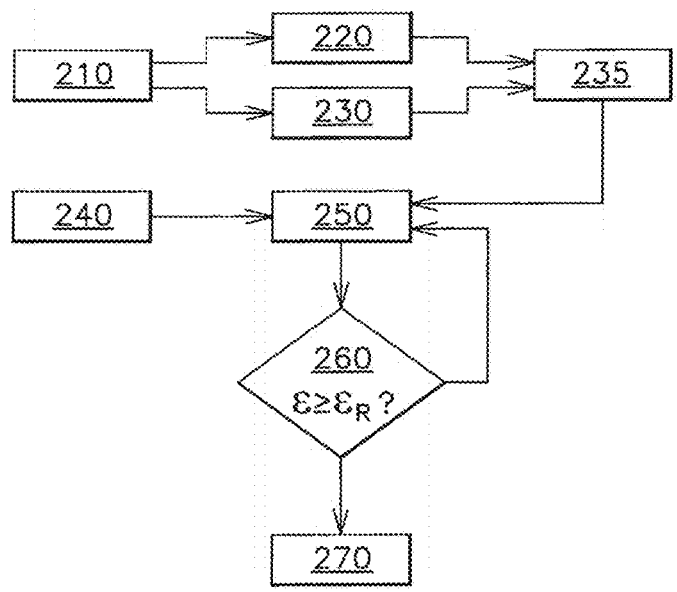
FIG. 4 is a logical diagram for implementing the method for checking the state of the suspension of a vehicle according to the invention.

The logical diagram in FIG. 4 shows implementation of the method for checking the state of the suspension of a vehicle according to the invention, using the previous example based on a stereoscopic system carried on-board a vehicle. For this purpose, the stereoscopic system has a digital module for processing the data coming from the cameras, this module enabling the following steps to be performed: A first step 210 periodically stores the pixels in the pairs of images of the forward field of vision Va of the real three-dimensional road 110 (FIG. 2) generated by the stereoscopic system 60 (FIGS. 1 and 2). An image processing step 220 stores the pixels of the reference road 100 and the relative values of the profile of the real road 110 in relation to the linear profile of the reference road 100 (FIG. 2).

In parallel to this, a step 230 acquiring and storing successive values of the six basic rotational and translational positional parameters of the path of the camera Ts is also performed using the images saved in step 210.

The values of the six basic positional parameters in step 230 and the relative values of the profile of the real three-dimensional road 110 in relation to the linear profile of the reference road 100 (step 220) are used to determine the path Ts of the vehicle (FIG. 3) using successive values of the specific positional parameters, knowing the speed of the vehicle (step 235). In the example embodiment, the specific positional parameters are the height "h" of the irregularities 101 in the real three-dimensional road 110 on which the vehicle is moving, as well as the height "z" and pitch rotation "Θ" of the vehicle (see FIG. 2).

A suspension model is selected from a model library in step 240. The model accurately translates the effects of the configuration of the suspension of the vehicle being checked using the modelling type of same (distribution of equivalent springs and shock absorbers, number of stages and control type) and the intrinsic parameter values of these equivalents. These intrinsic parameters relate to the stiffness "K" of the springs and the compression ratio "C" of the shock absorbers. In the example, the two-stage active suspension model in FIG. 2 is used.

In step 250, the mean square error $\Delta P^2$ of the deviations between the value of the intrinsic parameters of the suspension model chosen in the ideal state of same (corresponding to a new suspension system) and the value of these intrinsic parameters corresponding to the vehicle path parameter values stored (the specific positional parameters "h", "z" and "Θ" in the example) are minimized. As long as the accuracy ε of the square error $\Delta P^2$ of said deviations is less than a reference accuracy value $\varepsilon_R$ (step 260), the previous step is repeated.

When the accuracy ε reaches a predetermined value, for example $\varepsilon_R$, a suspension state diagnosis is provided as a function of the value of the mean square error $\Delta P^2$ (step 270). If this state corresponds to a potentially dangerous, or "pre-critical", state, a visual alarm is triggered on the dashboard of the vehicle by sending information over a controller area network (CAN) bus. Advantageously, if the accuracy ε is particularly high, greater than a predetermined threshold value, it is possible to determined a state of inflation of the tire or to identify the suspension component (suspension members proper or tires) that is responsible for the pre-critical state, or to predict the time of a failure.

The invention is not limited to the examples described and shown. As such, the invention may be applied to visual systems fitted with just one camera. The profile of the road is then detected by analyzing the optical stream to identify movements between two successive images.

Depending on the processing power available, the suspension model selected may be more or less sophisticated and the number of basic positional and suspension parameters may be adjusted to advantageously obtain adequate accuracy, that is greater than a predetermined threshold value, corresponding to the desired information on suspension and potentially inflation state.

Furthermore, the noise in the disparities between pairs of images in a stereoscopic visual system is advantageously filtered, in particular by applying mathematical morphology tools to a disparity map.

The invention claimed is:

1. A method for checking the state of degradation of a suspension system (10) fitted to a motor vehicle (1), comprising:
   periodically acquiring (210), by at least one camera (6, 7) of a visual system (60) carried on board the vehicle (1), successive images of a road (110) within a forward field of vision (Va) of the at least one camera, and storing said images of the road (110) in the form of pixels in a data storage;
   using image processing (220) to determine and store, from the stored pixels of the road (110) and from stored pixels of a flat reference road (100), positional data corresponding to relative values of a profile of the road (110) in relation to a linear profile of the reference road (100);
   determining and storing (230), from the stored pixels of the road (110), rotational and translational positional parameter data of the vehicle;
   using the determined relative positional data, the determined rotational and translational positional parameter data of the vehicle, and a speed of the vehicle to determine (235) a path (Ts) of the vehicle (1);
   carrying out and iterating a minimization function of an error ($\Delta P^2$) between stored suspension parameter values (K, C) of an ideal model suspension and suspension parameter values corresponding to the determined path (Ts) until an accuracy ε of said error ($\Delta P^2$) reaches a predetermined value $\varepsilon_R$; and
   upon a value of the accuracy ε reaching the predetermined value $\varepsilon_R$, diagnosing a state of the suspension (270) as a function of the error ($\Delta P^2$) in order to trigger an alarm in the event of of a pre-critical suspension state.

2. The method for checking the state of a suspension system as claimed in claim 1, wherein the on-board visual system is a stereoscopic system (60) comprising two cameras (6, 7) that generate successive pairs of images and generate three-dimensional data on the basis of disparities between each pair of images.

3. The method for checking the state of a suspension system as claimed in claim 2, further comprising:
   digitally filtering a noise of said disparities.

4. The method for checking the state of a suspension system as claimed in claim 3, wherein the flat reference road (100) determined by averaging standard deviations of the positional data of the road (110) with a predetermined number of pixels.

5. The method for checking the state of a suspension system as claimed in claim 3, wherein the path (Ts) of the vehicle (1) is determined (235) by successive values of parameters relating to a height of the road (110) and a height of the vehicle (1), and positional parameter values of said rotational and translational positional parameter data of the vehicle, including at least one of a roll rotation and a pitch rotation of the vehicle (1), said positional parameter values being determined using the acquired and stored positional data and said rotational and translational positional parameter data.

6. The method for checking the state of a suspension system as claimed in claim 3, wherein a model suspension is selected for each wheel (5a, 5b) of the vehicle (1) from a library (240) stored in the data storage, including a model for a single-stage suspension system, and for a two-stage suspension system.

7. The method for checking the state of a suspension system as claimed in claim 2, wherein the flat reference road (100) determined by averaging standard deviations of the positional data of the road (110) with a predetermined number of pixels.

8. The method for checking the state of a suspension system as claimed in claim 2, wherein the path (Ts) of the vehicle (1) is determined (235) by successive values of parameters relating to a height of the road (110) and a height of the vehicle (1), and positional parameter values of said rotational and translational positional parameter data of the vehicle, including at least one of a roll rotation and a pitch rotation of the vehicle (1), said positional parameter values being determined using the acquired and stored positional data and said rotational and translational positional parameter data.

9. The method for checking the state of a suspension system as claimed in claim 2, wherein a model suspension is selected for each wheel (5a, 5b) of the vehicle (1) from a library (240) stored in the data storage, including a model for a single-stage suspension system, and for a two-stage suspension system.

10. The method for checking the state of a suspension system as claimed in claim 2, wherein the suspension system (10) is controlled using active, semi-active or passive control (6A, 6B).

11. The method for checking the state of a suspension system as claimed in claim 1, wherein the flat reference road (100) determined by averaging standard deviations of the positional data of the road (110) with a predetermined number of pixels.

12. The method for checking the state of a suspension system as claimed in claim 11, wherein the path (Ts) of the vehicle (1) is determined (235) by successive values of parameters relating to a height of the road (110) and a height of the vehicle (1), and positional parameter values of said rotational and translational positional parameter data of the vehicle, including at least one of a roll rotation and a pitch rotation of the vehicle (1), said positional parameter values being determined using the acquired and stored positional data and said rotational and translational positional parameter data.

13. The method for checking the state of a suspension system as claimed in claim 11, wherein a model suspension is selected for each wheel (5a, 5b) of the vehicle (1) from a library (240) stored in the data storage, including a model for a single-stage suspension system, and for a two-stage suspension system.

14. The method for checking the state of a suspension system as claimed in claim 1, wherein the path (Ts) of the vehicle (1) is determined (235) by successive values of parameters relating to a height of the road (110) and a height of the vehicle (1), and positional parameter values of said rotational and translational positional parameter data of the vehicle, including at least one of a roll rotation and a pitch rotation of the vehicle (1), said positional parameter values being determined using the acquired and stored positional data and said rotational and translational positional parameter data.

15. The method for checking the state of a suspension system as claimed in claim 14, wherein a model suspension is selected for each wheel (5a, 5b) of the vehicle (1) from a library (240) stored in the data storage, including a model for a single-stage suspension system, and for a two-stage suspension system.

16. The method for checking the state of a suspension system as claimed in claim 1, wherein a model suspension is selected for each wheel (5a, 5b) of the vehicle (1) from a library (240) stored in the data storage, including a model for a single-stage suspension system, and for a two-stage suspension system.

17. The method for checking the state of a suspension system as claimed in claim 16, wherein the suspension parameters of the model suspension comprise a spring stiffness (K) and a shock absorber compression ratio (C) for each wheel (2a, 2b).

18. The method for checking the state of a suspension system as claimed in claim 1, wherein the suspension system (10) is controlled using one of active, semi-active, or passive control (6A, 6B).

19. The method for checking the state of a suspension system as claimed in claim 1, wherein the accuracy ε of the error ($\Delta P^2$) enables determination of a state of inflation of tires (5a, 5b) of the vehicle.

20. The method for checking the state of a suspension system as claimed in claim 19, wherein the accuracy ε of the error ($\Delta P^2$) makes possible a determination of which of suspension members or tires (5a, 5b) causes the pre-critical state.

* * * * *